United States Patent
Li et al.

(10) Patent No.: US 11,409,126 B2
(45) Date of Patent: Aug. 9, 2022

(54) LIGHT ADJUSTMENT APPARATUS, 3D DISPLAY APPARATUS, AND CONTROL METHOD THEREOF

(71) Applicant: BOE TECHNOLOGY GROUP CO., LTD., Beijing (CN)

(72) Inventors: Zhongxiao Li, Beijing (CN); Xue Dong, Beijing (CN); Xiaochuan Chen, Beijing (CN); Wenqing Zhao, Beijing (CN); Jinye Zhu, Beijing (CN); Chenyu Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 622 days.

(21) Appl. No.: 16/332,114

(22) PCT Filed: Aug. 29, 2018

(86) PCT No.: PCT/CN2018/102938
§ 371 (c)(1),
(2) Date: Mar. 11, 2019

(87) PCT Pub. No.: WO2019/062437
PCT Pub. Date: Apr. 4, 2019

(65) Prior Publication Data
US 2021/0356761 A1    Nov. 18, 2021

(30) Foreign Application Priority Data
Sep. 28, 2017    (CN) .......................... 201710902985.0

(51) Int. Cl.
*G02B 30/33* (2020.01)
*G02F 1/1335* (2006.01)

(52) U.S. Cl.
CPC ....... *G02B 30/33* (2020.01); *G02F 1/133512* (2013.01); *G02F 1/133565* (2021.01)

(58) Field of Classification Search
None
See application file for complete search history.

(56) References Cited

U.S. PATENT DOCUMENTS

2008/0259257 A1*  10/2008  Aota ................. G02F 1/134363
                                                                            349/106
2013/0113767 A1*   5/2013  Hayashi ............... G09G 3/3406
                                                                            345/207
(Continued)

FOREIGN PATENT DOCUMENTS

CN        101975995 A        2/2011
CN        102122097 A        7/2011
(Continued)

OTHER PUBLICATIONS

Extended (Supplementary) European Search Report dated Jul. 27, 2021, issued in counterpart EP application No. 18857434.7. (10 pages).

(Continued)

*Primary Examiner* — Shan Liu
(74) *Attorney, Agent, or Firm* — WHDA, LLP

(57) ABSTRACT

The present disclosure is related to a display panel. The display panel may include a plurality of pixel units. Each of the plurality of pixel units may include a first pixel unit or a second pixel unit. The first pixel unit may include a first light adjusting structure configured to adjust an angle of light that transmits through the first light adjusting structure. The second pixel unit may include a second light adjusting structure configured to adjust an angle of light that transmits through the second light adjusting structure. A plurality of first pixel units may be configured to display a left-eye image. A plurality of second pixel units may be configured to display a right-eye image.

16 Claims, 8 Drawing Sheets

(56) References Cited

U.S. PATENT DOCUMENTS

| | | | | |
|---|---|---|---|---|
| 2013/0286344 A1* | 10/2013 | Hayashi | .................... | G02F 1/29 |
| | | | | 349/193 |
| 2014/0063601 A1* | 3/2014 | Qu | .................... | G02F 1/133526 |
| | | | | 359/463 |
| 2014/0176835 A1 | 6/2014 | Hayashi | | |
| 2015/0077850 A1* | 3/2015 | Kasano | ................. | H04N 13/32 |
| | | | | 359/463 |
| 2017/0293152 A1* | 10/2017 | Zha | ........................ | G02B 30/29 |
| 2019/0013363 A1* | 1/2019 | Joo | ........................ | H01L 51/56 |
| 2019/0086699 A1 | 3/2019 | Wang et al. | | |

FOREIGN PATENT DOCUMENTS

| | | | | |
|---|---|---|---|---|
| CN | 102122104 | A | * | 7/2011 |
| CN | 102122104 | A | | 7/2011 |
| CN | 202735637 | U | | 2/2013 |
| CN | 105700164 | A | | 6/2016 |
| CN | 105842861 | A | | 8/2016 |
| CN | 105959672 | A | | 9/2016 |
| CN | 106292051 | A | | 1/2017 |
| CN | 106526976 | A | | 3/2017 |
| CN | 107255889 | A | * | 10/2017 |
| JP | 2002-040365 | A | | 2/2002 |
| JP | 2012-242574 | A | | 12/2012 |
| JP | 2012242574 | A | * | 12/2012 |

OTHER PUBLICATIONS

Ishizuka et al., "Viewing zone of an autostereoscopic display with a directional backlight using a convex lens array", Journal of Electronic Imaging, SPIE—International Society for Optical Engineering, vol. 23, No. 1, Jan. 1, 2014, p. 011002-1-011002-6, cited in EP Extended European Search Report dated Jul. 27, 2021. (7 pages).

International Search Report dated Nov. 23, 2018, issued in counterpart application No. PCT/CN2018/102938. (12 pages).

Office Action dated Aug. 13, 2019, issued in counterpart CN application No. 201710902985.0, with English translation. (19 pages).

Office Action dated Mar. 19, 2020, issued in counterpart CN Application No. 201710902985.0, with English translation (17 pages).

Office Action dated Jul. 21, 2020, issued in counterpart CN Application No. 201710902985.0, with English Translation. (17 pages).

* cited by examiner

LIGHT ADJUSTMENT APPARATUS, 3D DISPLAY APPARATUS, AND CONTROL METHOD THEREOF

CROSS-REFERENCE TO RELATED APPLICATIONS

This application claims benefit of the filing date of Chinese Patent Application No. 201710902985.0 filed on Sep. 28, 2017, the disclosure of which is hereby incorporated by reference.

TECHNICAL FIELD

This invention relates to a display technology, and more particularly, to a light adjustment apparatus, 3D display apparatus and control method thereof.

BACKGROUND

At present, three-dimensional (3D) display is greatly welcomed by a vast number of consumers due to its vivid expression, beautiful and elegant environment appeal, and strongly shocking visual impact.

Early 3D display apparatus require a viewer to wear corresponding 3D glasses, thereby making their applications subject to site and equipment constraints. Naked-eye 3D display apparatus developed in the recent years overcome the constraint of special-purpose glasses, and accordingly have received extensive attention.

BRIEF SUMMARY

Accordingly, one example of the present disclosure is a display panel. The display panel may include a first pixel unit and a second pixel unit. The first pixel unit may include a first light adjusting structure configured to adjust an angle of light that transmits through the first light adjusting structure, and a plurality of first pixel units may be configured to display a left-eye image. The second pixel unit may include a second light adjusting structure configured to adjust an angle of light that transmits through the second light adjusting structure, and a plurality of second pixel units may be configured to display a right-eye image. The first pixel unit and the second pixel unit may be alternatively disposed in the display panel.

According to some embodiments of the present disclosure, the first light adjusting structure may include a first transparent electrode, a second transparent electrode, a first liquid crystal layer, and a first sub-light adjusting structure. The first liquid crystal layer and the first sub-light adjusting structure may be between the first transparent electrode and the second transparent electrode. The second light adjusting structure may include the first transparent electrode, the second transparent electrode, and a second liquid crystal layer between the first transparent electrode and the second transparent electrode.

According to some embodiments of the present disclosure, the second light adjusting structure may further include a second sub-light adjusting structure. The second sub-light adjusting structure may be between the first transparent electrode and the second transparent electrode.

According to some embodiments of the present disclosure, the first sub-light adjusting structure may include a first upper sub-light adjusting structure and a first lower sub-light adjusting structure being respectively on both sides of the first liquid crystal layer. The second sub-light adjusting structure may include a second upper sub-light adjusting structure and a second lower sub-light adjusting structure being respectively on both sides of the second liquid crystal layer.

According to some embodiments of the present disclosure, the display panel may further include a first base and a second base opposite the first base, the plurality of pixel units being between the first base and the second base. The first base may include a first surface. The first transparent electrode and the first lower sub-light adjusting structure of the first pixel unit may be stacked on the first surface. The first transparent electrode and the second lower sub-light adjusting structure of the second pixel unit may be stacked on the first surface. The second base may include a second surface. The second transparent electrode and the first upper sub-light adjusting structure of the first pixel unit may be stacked on the second surface. The second transparent electrode and the second upper sub-light adjusting structure of the second pixel unit may be stacked on the second surface.

According to some embodiments of the present disclosure, the first upper sub-light adjusting structure and the first lower sub-light adjusting structure may have different refractive indexes, and the second upper sub-light adjusting structure and the second lower sub-light adjusting structure may have different refractive indexes. The first upper sub-light adjusting structure and the first lower sub-light adjusting structure may be perpendicular to each other, and the second upper sub-light adjusting structure and the second lower sub-light adjusting structure may be perpendicular to each other.

According to some embodiments of the present disclosure, the first lower sub-light adjusting structure may include a first bottom surface and a first inclined surface opposite the first bottom surface. The first bottom surface may be arranged on the first base. The first inclined surface and the first bottom surface may form a first acute angle, and the first acute angle may be configured to determine exiting direction of a light that enters the first lower sub-light adjusting structure. The first upper sub-light adjusting structure may include a second bottom surface and a second inclined surface opposite the second bottom surface. The second bottom surface may be arranged on the second base. The second inclined surface and the second bottom surface may form a second acute angle, and the second acute angle may be configured to determine exiting direction of a light that enters the first upper sub-light adjusting structure.

According to some embodiments of the present disclosure, the second lower sub-light adjusting structure may include a third bottom surface and a third inclined surface opposite the third bottom surface. The third bottom surface may be arranged on the first base. The third inclined surface and the third bottom surface may form a third acute angle. The third acute angle may be configured to determine exiting direction of a light that enters the second lower sub-light adjusting structure. The second upper sub-light adjusting structure may include a fourth bottom surface and a fourth inclined surface opposite the fourth bottom surface. The fourth bottom surface may be arranged on the second base. The fourth inclined surface and the fourth bottom surface may form a fourth acute angle, and the fourth acute angle may be configured to determine exiting direction of a light that enters the second upper sub-light adjusting structure.

According to some embodiments of the present disclosure, the first liquid crystal layer and the second liquid crystal layer may include blue phase liquid crystals. A refractive index of the blue phase liquid crystals in the first liquid crystal layer and the second liquid crystal layer may be configured to be adjusted by an electrical field between the first transparent electrode and the second transparent electrode. A cross-section of the first upper sub-light adjusting structure along a plane perpendicular to the first base may have a shape of a right-angled triangle. A cross-section of the first lower sub-light adjusting structure along a plane perpendicular to the second base may have a shape of a right-angled triangle. A cross-section of the second upper sub-light adjusting structure along a plane perpendicular to the first base may have a shape of a right-angled triangle. A cross-section of the second lower sub-light adjusting structure along a plane perpendicular to the second base may have a shape of a right-angled triangle.

According to some embodiments of the present disclosure, the plurality of pixel units may be separated by a black matrix. The black matrix may include a plurality of openings substantially coinciding with the plurality of pixel units respectively, and each of the plurality of openings may have a rhombus shape. The first sub-light adjusting structure and the second sub-light adjusting structure each may be made of a transparent resin.

According to some embodiments of the present disclosure, the first transparent electrode may be a planar electrode covering the first upper sub-light adjusting structure and the second upper sub-light adjusting structure, and the second transparent electrode may be a planar electrode covering the first lower sub-light adjustment structure and the second lower sub-light adjusting structure.

According to some embodiments of the present disclosure, a planarization layer may be formed on the first upper sub-light adjusting structure and the second upper sub-light adjusting structure, and another planarization layer may be formed on the first lower sub-light adjusting structure and the second lower sub-light adjusting structure.

According to some embodiments of the present disclosure, the display panel may further include a collimated dot matrix backlight module, wherein the collimated dot matrix backlight module may include a plurality of point light sources arranged in an array. Each of the point light sources may correspond to one of the plurality of pixel units. The collimated dot matrix backlight module may emit collimated light. In one embodiment, the collimated dot matrix backlight module emits the collimated light with a divergence angle of less than about 3. Each of the plurality of pixel units may include a color film.

Another example of the present disclosure is a display apparatus. The display apparatus may include the display panel according to one embodiment of the present disclosure.

BRIEF DESCRIPTION OF THE DRAWINGS

The subject matter which is regarded as the invention is particularly pointed out and distinctly claimed in the claims at the conclusion of the specification. The foregoing and other objects features, and advantages of the invention are apparent from the following detailed description taken in conjunction with the accompanying drawings in which:

DETAILED DESCRIPTION

Figure 1:
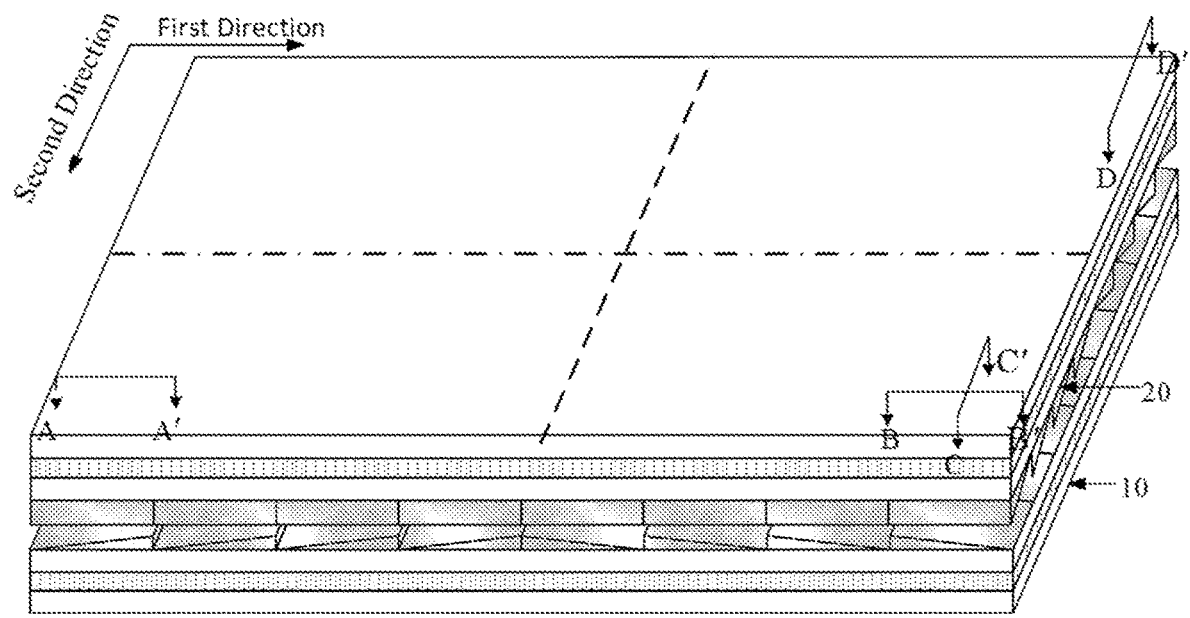
FIG. 1 is a schematic diagram of a light adjustment apparatus according to one embodiment of the present disclosure.

The present disclosure will be described in further detail with reference to the accompanying drawings and embodiments in order to provide a better understanding by those skilled in the art of the technical solutions of the present disclosure. Throughout the description of the disclosure, reference is made to FIGS. 1-10. When referring to the figures, like structures and elements shown throughout are indicated with like reference numerals.

In this specification, the terms such as "first" and "second" may be added as prefixes. These prefixes, however, are only added in order to distinguish the terms and do not have specific meaning such as order and relative merits.

FIG. 1 is a schematic diagram of a light adjustment apparatus according to one embodiment of the present disclosure. The light adjustment apparatus includes a first substrate 10, a second substrate 20, and a liquid crystal layer 15 filled between the first substrate 10 and the second substrate 20 (not shown in FIG. 1). The first substrate 10 and the second substrate 20 are assembled to form a cell.

Figure 2A:
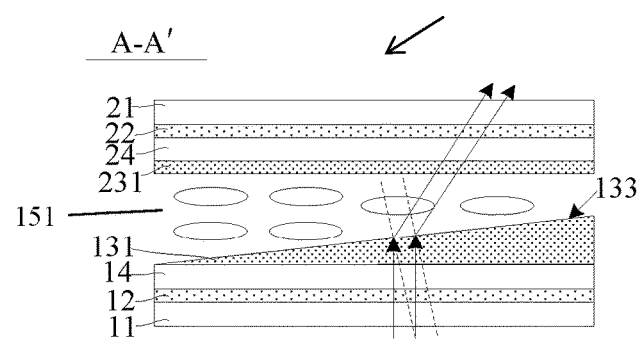
FIG. 2a is a sectional view along AA' line in FIG. 1 and an optical path diagram of light adjustment according to one embodiment of the present disclosure.
Figure 2B:
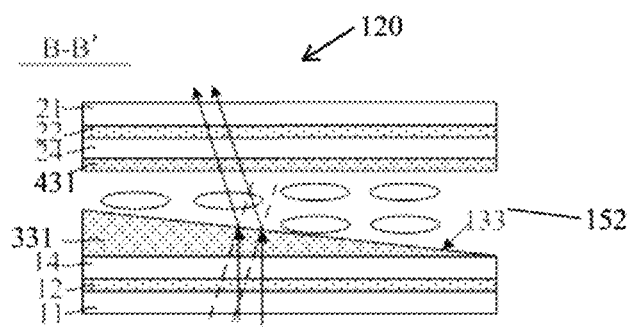
FIG. 2b is a sectional view along BB' line in FIG. 1 and an optical path diagram of light adjustment according to one embodiment of the present disclosure.

In one embodiment, the display panel may include a first pixel unit 110 and a second pixel unit 120. FIG. 2a is a sectional view along AA' line in FIG. 1. As shown in FIG. 2a, the first pixel unit 110 may include a first light adjusting structure configured to adjust an angle of light that transmits through the first light adjusting structure. A plurality of the first pixel units may be configured to display a right-eye image. As shown in FIG. 2b, the second pixel unit 120 may include a second light adjusting structure configured to adjust an angle of light that transmits through the second light adjusting structure. A plurality of the second pixel units may be configured to display a left-eye image. In one embodiment, a block of the first pixel units and a block of the second pixel units are alternatively disposed in the display panel. For example, as shown in FIG. 1, a block of four first pixel units and a block of four second pixel units are alternately disposed in the display panel. In another embodiment, one first pixel unit and one second pixel unit are alternatively disposed in the display panel.

In one embodiment, as shown in FIG. 2a, the first light adjusting structure includes a first transparent electrode 12, a second transparent electrode 22, a first liquid crystal layer 151, and a first sub-light adjusting structure 13. The first liquid crystal layer 151 and the first sub-light adjusting structure 13 are between the first transparent electrode 12 and the second transparent electrode 22. In one embodiment, the first sub-light adjusting structure may include a first upper sub-light adjusting structure 231 and a first lower sub-light adjusting structure 131 being respectively on both sides of the first liquid crystal layer 151.

Figure 3:
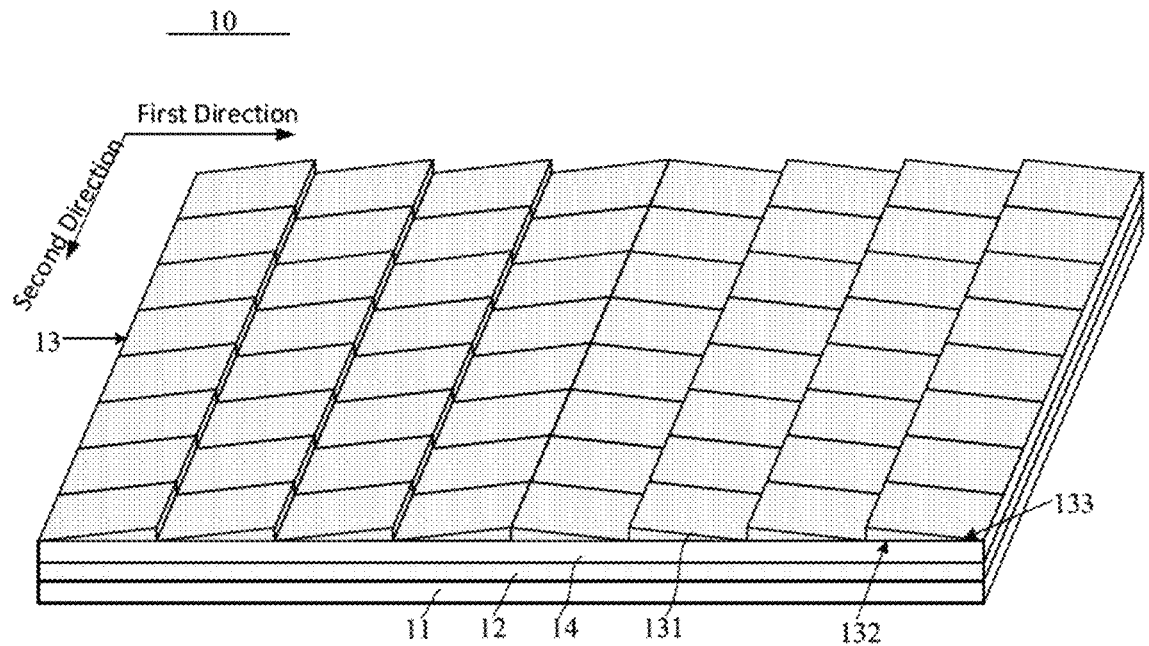
FIG. 3 is a schematic diagram of a first substrate according to one embodiment of the present disclosure.

FIG. 2b is a sectional view along BB' line in FIG. 1. As shown in FIG. 2b, the second light adjusting structure may include a first transparent electrode 12, a second transparent electrode 22, a second liquid crystal layer 152, and a second sub-light adjusting structure 33. The second liquid crystal layer 152 and the second sub-light adjusting structure 33 are between the first transparent electrode 12 and the second transparent electrode 22. The second sub-light adjusting structure 33 may include a second lower sub-light adjusting structure 331 and a second upper sub-light adjusting structure 431 being respectively on both sides of the second liquid crystal layer 152. FIG. 3 is a schematic diagram of a first substrate 10 according to one embodiment of the present disclosure. As shown in FIG. 3, the first substrate 10 includes a first base 11, a first transparent electrode 12, first lower sub-light adjusting structures, and second lower sub-light adjusting structures. The first transparent electrode 12 and the first and second lower sub-light adjusting structures are stacked on the first base 11. The first lower sub-light adjusting structures are used for delivering right-eye images to the viewer's right eye (hereinafter "the right eye") and the second lower sub-light adjusting structures are used for delivering left-eye images to a viewer's left eye (hereinafter "the left eye") in a first direction.

Figure 4:
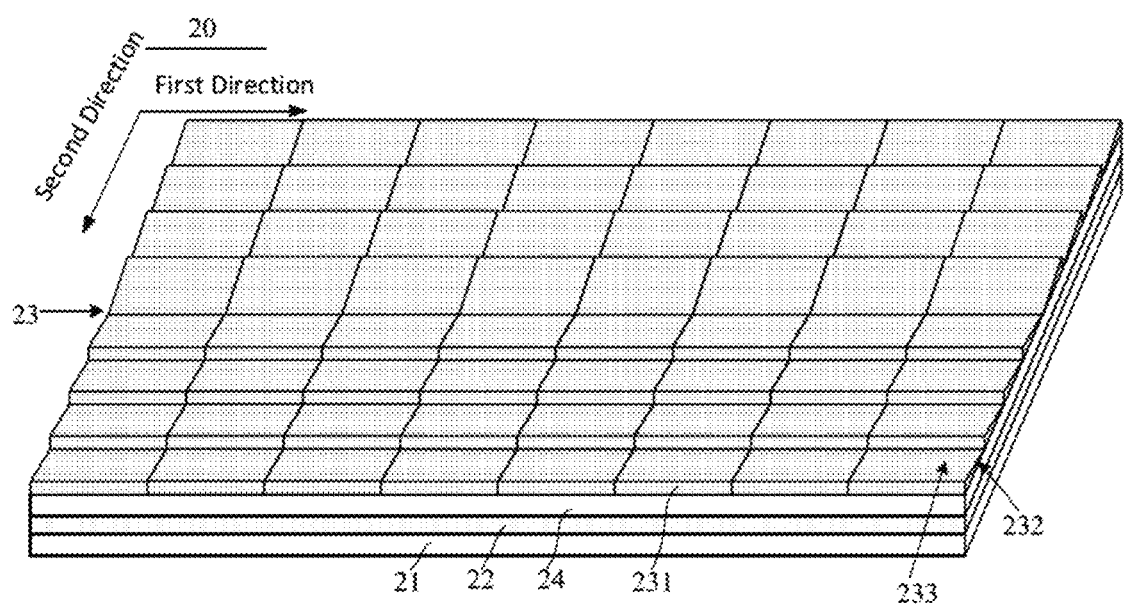
FIG. 4 is a schematic diagram of a second substrate according to one embodiment of the present disclosure.

FIG. 4 is a schematic diagram of a second substrate according to one embodiment of the present disclosure. As shown in FIG. 4, the second substrate 20 includes a second base 21, a second transparent electrode 22, first upper sub-light adjusting structures and second upper sub-light adjusting structures. The second transparent electrode 22 and the first and second upper sub-light adjusting structures are stacked on the second base 21. The first upper sub-light adjusting structures are used for delivering right-eye images to the right eye and the second upper sub-light adjusting structure are used for delivering left-eye images to the left eye in a second direction.

The first direction may be perpendicular to the second direction. The first and second lower light adjusting structures and the first and second upper light adjusting structures are arranged close to the liquid crystal layer. Refractive indexes of the first and second lower light adjusting structures may be different from those of the first and second upper light adjusting structures respectively.

In one embodiment, as shown in FIGS. 2a and 2b, the display panel may further include a first base 11 and a second base 21 opposite the first base. The plurality of pixel units may be between the first base 11 and the second base 12. As shown in FIG. 2a, the first base 11 may include a first surface. The first transparent electrode 12 and the first lower sub-light adjusting structure 131 of the first pixel unit are stacked on the first base. As shown in FIG. 2b, the first transparent electrode 12 and the second lower sub-light adjusting structure 331 of the second pixel unit are also stacked on the first surface. The second base 21 may include a second surface. As shown in FIG. 4c, the second transparent electrode 22 and the first upper sub-light adjusting structure 231 of the first pixel unit are stacked on the second surface. As shown in FIG. 4d, the second transparent electrode 22 and the second upper sub-light adjusting structure 431 of the second pixel unit are stacked on the second surface.

Figure 2C:
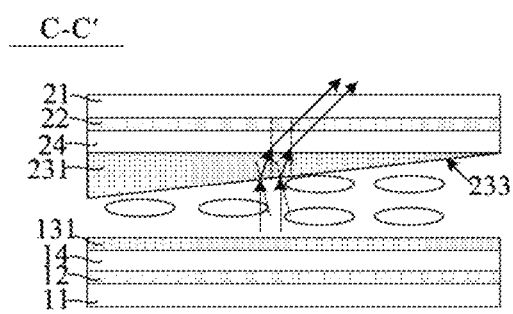
FIG. 2c is a sectional view along CC line in FIG. 1 and an optical path diagram of light adjustment according to one embodiment of the present disclosure.

In one embodiment, as shown in FIG. 2a, the first lower sub-light adjusting structure 131 comprises a first bottom surface 132 and a first inclined surface 133 opposite the first bottom surface 132. The first bottom surface is arranged on the first base. The first inclined surface and the first bottom surface form a first acute angle. The first acute angle is configured to determine exiting direction of a light that enters the first lower sub-light adjusting structure. As shown in FIG. 2c, the first upper sub-light adjusting structure 231 may include a second bottom surface and a second inclined surface opposite the second bottom surface. The second bottom surface is arranged on the second base. The second inclined surface and the second bottom surface form a second acute angle, and the second acute angle is configured to determine exiting direction of a light that enters the first upper sub-light adjusting structure.

Figure 2D:
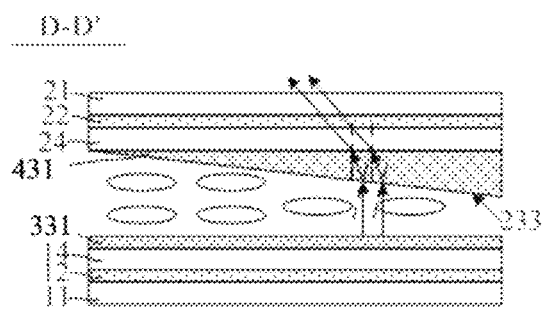
FIG. 2d is a schematic view along DD' line in FIG. 1 and an optical path diagram of light adjustment according to one embodiment of the present disclosure.

In one embodiment, as shown in FIG. 2b, the second lower sub-light adjusting structure 331 may include a third bottom surface 332 and a third inclined surface 333 opposite the third bottom surface. The third bottom surface is arranged on the first base. The third inclined surface and the third bottom surface form a third acute angle, and the third acute angle is configured to determine exiting direction of a light that enters the second lower sub-light adjusting structure. As shown in FIG. 2d, the second upper sub-light adjusting structure 431 may include a fourth bottom surface and a fourth inclined surface opposite the fourth bottom surface. The fourth bottom surface is arranged on the second base. The fourth inclined surface and the fourth bottom surface form a fourth acute angle, and the fourth acute angle is configured to determine exiting direction of a light that enters the second upper sub-light adjusting structure.

In one embodiment, the first upper sub-light adjusting structure 231 and the first lower sub-light adjusting structure 131 may have different refractive indexes. The second upper sub-light adjusting structure 431 and the second lower sub-light adjusting structure 331 may have different refractive indexes. The first upper sub-light adjusting structure 231 and the first lower sub-light adjusting structure 131 are perpendicular to each other. That is, the inclining direction of the first inclined surface of the first lower sub-light adjusting structure is perpendicular to that of the second inclined surface of the first upper sub-light adjusting structure. The second upper sub-light adjusting structure 431 and the second lower sub-light adjusting structure 331 may be perpendicular to each other. That is, the inclining direction of the third inclined surface of the first lower sub-light adjusting structure is perpendicular to that of the fourth inclined surface of the first upper sub-light adjusting structure.

In one embodiment, when the first and second lower sub-light adjusting structures are controlled to deliver a left eye image to the left eye and a right eye image to the right eye, the electric field between the first transparent electrode 12 and the second transparent electrode 22 is controlled so that the refractive index of the liquid crystal layer is the same as that of the first or the second upper sub-light adjusting structures 23. When the refractive index of the first or second upper sub-light adjusting structure 13 are fixed, the degree of the acute angle formed between the first inclined surface 133 and the first bottom surface 132 of the first lower sub-light adjusting structure 131 in the first light adjusting structure 13 is adjusted to control the emergent direction of the light which enters the first lower sub-light adjusting structure 13, exits from the first upper sub-light adjusting structure 23, and finally exits from the second base 21. Furthermore, the degree of the acute angle formed between the third inclined surface 133 and the third bottom surface 132 of the second lower sub-light adjusting structure 331 in the second light adjusting structure 33 is adjusted to control the emergent direction of the light which enters the second lower sub-light adjusting structure 331, exits from the second upper sub-light adjusting structure 431, and finally exits from the second base 21.

In one embodiment, a number of the first inclined surfaces 133 of the first sub-light adjusting structures 131 are inclined towards one direction, and a number of the third inclined surfaces 133 of the second sub-light adjusting structures 131 are inclined in an opposite direction. This ensures that a complete left-eye image can be delivered into the left eye, and a complete right-eye image is delivered into the right eye.

For a 3D display apparatus, a line in the second direction can be set as an optimal 3D viewing position when the light adjustment apparatus is manufactured. For example, the dotted line, as shown in FIG. 1, is the optimal watching position. The first inclined surfaces 133 of the first lower sub-light adjusting structures 131 and the third inclined surfaces of the second lower sub-light adjusting structure on both sides of the dotted line are inclined respectively toward the two sides of the first base 11 facing each other in the second direction.

Figure 5:
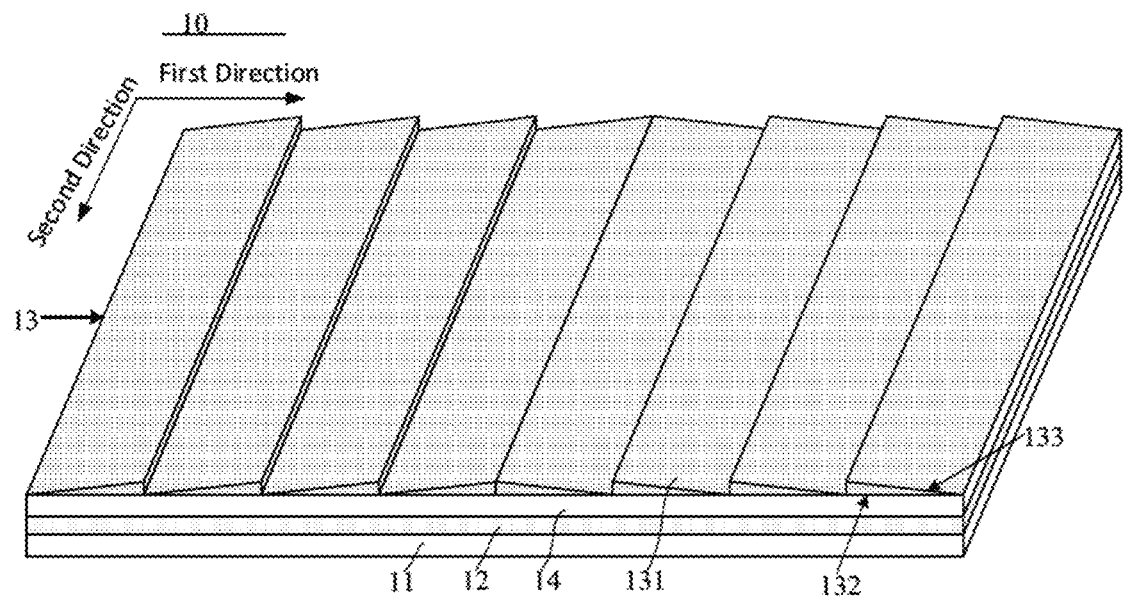
FIG. 5 is a schematic diagram of a first substrate according to one embodiment of the present disclosure.

In one embodiment, in order to further simplify the process, as shown in FIG. 5, a plurality of first lower sub-light adjusting structures in a column may be merged to form a unitary strip-shaped structure extending in the second direction. A plurality of second lower sub-light adjusting structures in a column direction may be merged to form a unitary strip-shaped structure extending in the second direction. As such, by adjusting the first acute angle formed by the first bottom surface of the first lower sub-light adjusting structure and the first inclined surface thereof, light emitted by the corresponding column of sub-pixels is delivered into the right-eye. By adjusting the third acute angle formed by the third bottom surface of the second lower sub-light adjusting structure and the third inclined surface thereof, light emitted by the corresponding column of sub-pixels is delivered into the left-eye.

Figure 6:
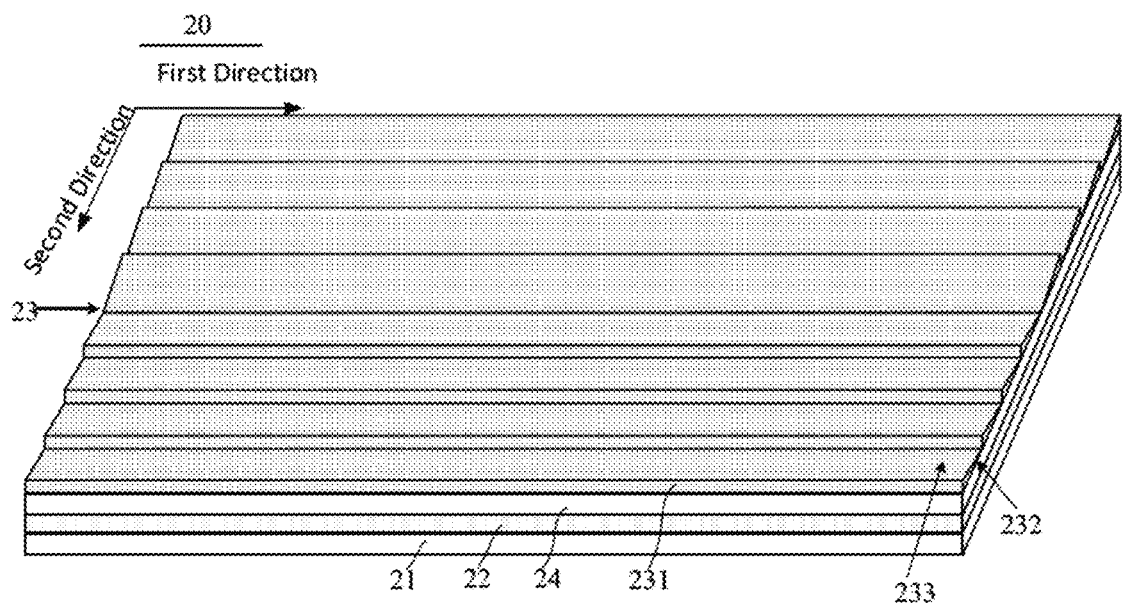
FIG. 6 is a schematic diagram of a second substrate according to one embodiment of the present disclosure.

In one embodiment, in order to further simplify the process, as shown in FIG. 6, a plurality of first upper sub-light adjusting structures in a row may be merged to form a unitary strip-shaped structure extending in the first direction. A plurality of second upper sub-light adjusting structures in a row direction may be merged to form a unitary strip-shaped structure extending in the first direction. As such, by adjusting the second acute angle formed by the second bottom surface of the first upper sub-light adjusting structure and the second inclined surface thereof, light emitted by the corresponding row of sub-pixels is delivered into the right-eye. By adjusting the fourth acute angle formed by the fourth bottom surface of the second upper sub-light adjusting structure and the fourth inclined surface thereof, light emitted by the corresponding row of sub-pixels is delivered into the left-eye.

In one embodiment, a cross-section of the first upper sub-light adjusting structure along a plane perpendicular to the first base has a shape of a right-angled triangle. A cross-section of the first lower sub-light adjusting structure along a plane perpendicular to the second base has a shape of a right-angled triangle. A cross-section of the second upper sub-light adjusting structure along a plane perpendicular to the first base has a shape of a right-angled triangle. A cross-section of the second lower sub-light adjusting structure along a plane perpendicular to the second base has a shape of a right-angled triangle.

Figure 7:
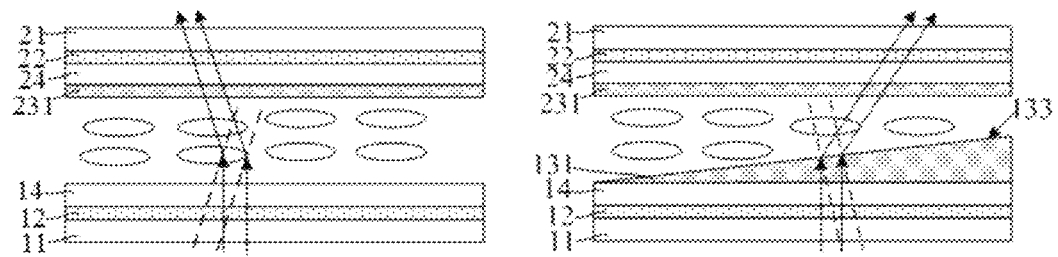
FIG. 7 is a schematic diagram of an optical path for realizing a 3D display function according to one embodiment of the present disclosure.
Figure 8:
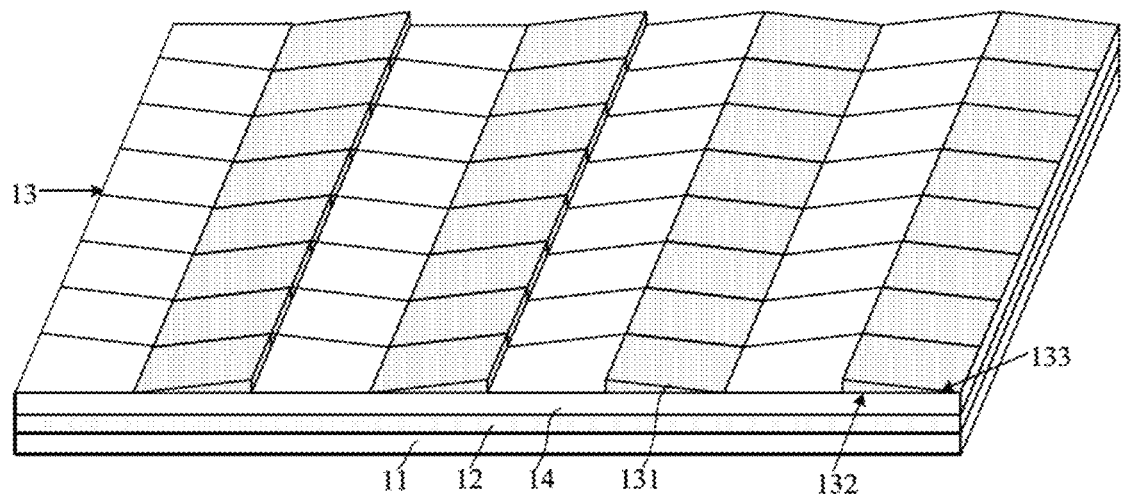
FIG. 8 is a schematic diagram of a first substrate according to one embodiment of the present disclosure.

In one embodiment, as shown in FIGS. 7 and 8, the second light adjusting structure includes a first transparent electrode 12, a second transparent electrode 22, and a second liquid crystal layer 152 between the first transparent electrode 32 and the second transparent electrode 42. There is no second sub-light adjusting structure in the second pixel unit. The angle of light that transmits through the second light adjusting structure is adjusted by the second liquid crystal layer only.

Figure 9:
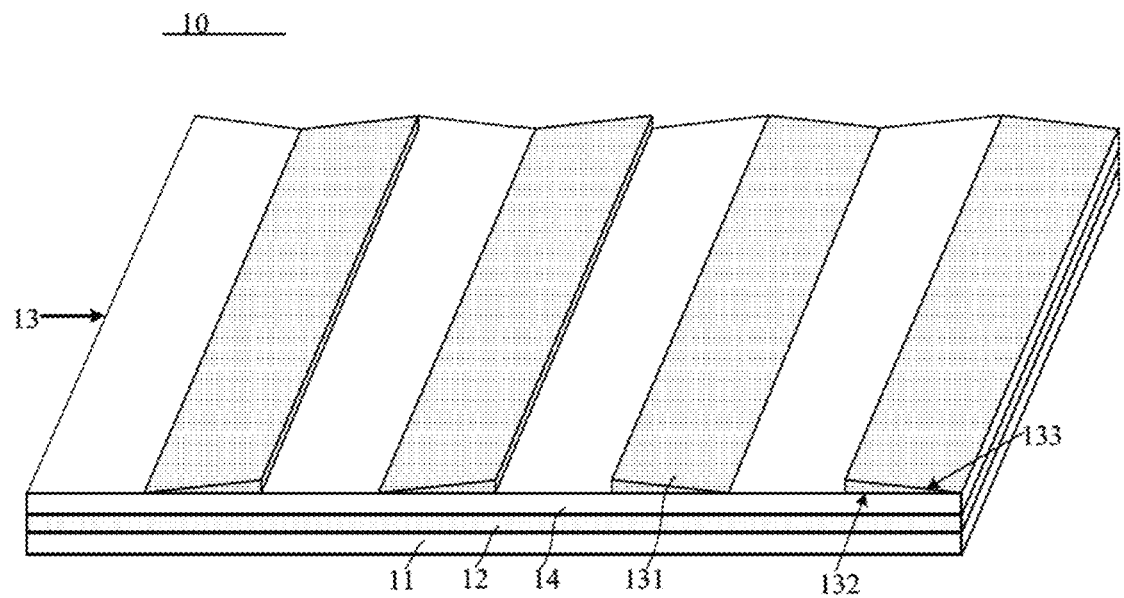
FIG. 9 is a schematic diagram of a first substrate according to one embodiment of the present disclosure.

In one embodiment, as shown in FIG. 9, a plurality of first lower sub-light adjusting structures in a column may be merged to form a unitary strip-shaped structure extending in the second direction. Similarly, a plurality of first upper sub-light adjusting structures in a row may be merged to form a unitary strip-shaped structure extending in the first direction.

Figure 10:
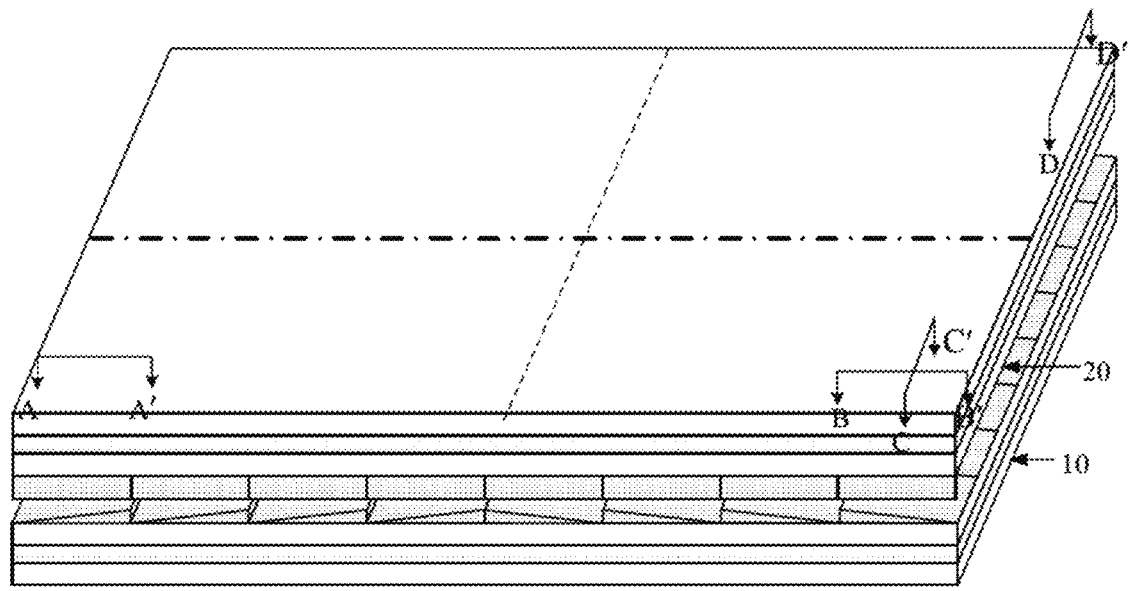
FIG. 10 is a schematic diagram of a 3D display apparatus according to one embodiment of the present disclosure.

In one embodiment, as shown in FIG. 10, there are neither first upper sub-light adjusting structures nor second upper sub-light adjusting structures. The angle of light in the second direction is controlled by the liquid crystal layer 15.

Figure 11:
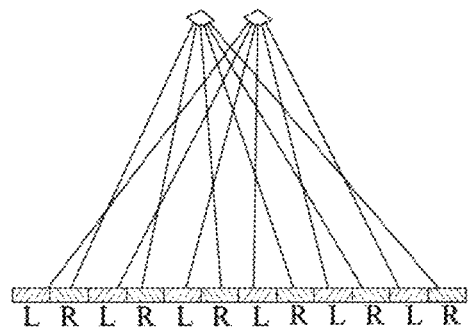
FIG. 11 is a schematic diagram of optical path for realizing a 3D display function according to one embodiment of the present disclosure.

FIG. 11 is a schematic diagram of optical path for realizing a 3D display function according to one embodiment of the present disclosure.

As shown in FIG. 2a, when the refractive index of the first lower sub-light adjusting structure is larger than that of the first upper sub-light adjusting structure 23, the light exiting from the first lower sub-light adjusting structure 131 located on the left side of the line inclines rightward. As shown in FIG. 2 b, the light exiting from the second lower sub-light adjusting structure 131 located on the right side of the line inclines leftward. As a result, a complete left-eye image is delivered into the left eye, and a complete right-eye image is delivered into the right eye, as shown in FIG. 11.

In contrast, when the refractive index of the first lower sub-light adjusting structure 13 is smaller than that of the first upper sub-light adjusting structure 23, inclination direction of the first inclined surface 133 of the first sub-light adjusting structure 131 should be changed. As such, the first upper sub-light adjusting structure 131 positioned on the left side of the line enables the exiting light to incline rightward, and the second upper sub-light adjusting structure 131 located on the right side of the line enables exiting light to incline leftward. As a result, a complete left-eye image can be delivered into the left eye, and a complete right-eye image is delivered into the right eye.

Based on the above description of the first light adjusting structure 13, the structure thereof is simple.

In one embodiment, the shape of cross section of the first sub-light adjusting structure 131 in the first direction is a right triangle. Compared with the shape of a right-angled trapezoid and the like, the shape of the right triangle can guarantee the required degree of the acute angle. Moreover, it could make a thickness of the first sub-light adjusting structure 131 thinner, thereby satisfying requirements for the thin 3D display apparatus.

In one embodiment, a number of second inclined surfaces of the first upper sub-light adjusting structures 231 are inclined toward one direction, and a number of fourth inclined surfaces of the second upper sub-light adjusting structures 431 are inclined in the opposite direction. This ensures that a complete left-eye image can be delivered into the left eye, and a complete right-eye image is delivered into the right eye, as shown in FIG. 4.

For a 3D display apparatus, there is an optimal 3D viewing position. When a light adjustment apparatus is manufactured, a line in the first direction can be set as the optimal 3D viewing position, such as the dash-dot line as shown in FIG. 1. This line is the optimal watching position. The inclined surfaces 233 of the sub-light adjusting structures 231 on both sides of this line are inclined respectively to the two sides of the first base 11 opposite each other in the first direction. As such, as shown in FIG. 4c, when the refractive index of the second light adjusting structure is smaller than that of the first light adjusting structure, the second sub-light adjusting structures positioned on the lower side of the line enable the exiting light to incline upward. As shown in FIG. 4d, the second sub-light adjusting structures located on the upper side of the line enable the exiting light to incline downward. This ensures that a complete left-eye image is delivered into the left eye, and a complete right-eye image is delivered into the right eye.

Based on the above description, the structure of the second light adjusting structure 23 could be simple.

In one embodiment, because a transparent resin typically has good light transmission and the shape of the right triangle can be easily manufactured from the transparent resin, the material for the first light adjusting structure 13 and the second light adjusting structure 33 may comprise a transparent resin.

In one embodiment, as shown in FIG. 3 and FIG. 4, a first substrate 10 can further comprise a first planarization layer 14 between the first transparent electrode 12 and the first light adjusting structure 13. A second substrate 20 can further comprise a second planarization layer 24 between the second transparent electrode 22 and the second light adjusting structure 23. In this way, when the first substrate 10 is manufactured, the first planarization layer 14 is formed first. A first light adjusting structure 13 is manufactured on the first planarization layer 14, thereby avoiding the manufacturing deviation of the first light adjusting structure 13 due to the uneven lower layer. Otherwise, performance of the light adjustment may be affected.

Similarly, when the second substrate 20 is manufactured, the second planarization layer 24 is formed first. A second light adjusting structure 23 is manufactured on the second flat layer 24, thereby avoiding the manufacturing deviation of the second light adjusting structure 23 due to the uneven lower layer. Otherwise, performance of the light adjustment may be affected.

In one embodiment, the first transparent electrode 12 may be a planar electrode and covers the first light adjusting structure 13. The second transparent electrode 22 may be a planar electrode and covers the second light adjusting structure 23.

In one embodiment, the first transparent electrode 12 and the second transparent electrode 22 are used to control the refractive index of the liquid crystal layer. The refractive index of the whole liquid crystal layer of the light adjusting apparatus should be the same at a certain moment, that is, the voltages on the first transparent electrode 12 in the whole light adjustment apparatus should be the same, and the voltages on the second transparent electrode 22 in the whole light adjustment apparatus should be the same. So the first transparent electrode 12 and the second transparent electrode 22 can be made into a planar shape, thereby simplifying the manufacturing process.

In one embodiment, the first liquid crystal layer and the second liquid crystal layer may include blue phase liquid crystals. A refractive index of the blue phase liquid crystals in the first liquid crystal layer and in the second liquid crystal layer may be configured to be adjusted by an electrical field between the first transparent electrode and the second transparent electrode.

In the embodiment, liquid crystals in the liquid crystal layer are blue phase liquid crystals. Because a common liquid crystal only controls polarized light, a Polaroid film is usually required to obtain the polarized light. In contrast, the blue-phase liquid crystal can control natural light. That is, when the liquid crystals are blue phase liquid crystals, no Polaroid film is needed, thereby reducing thickness of the light adjustment apparatus and manufacturing cost.

When the liquid crystals in the liquid crystal layer are blue phase liquid crystals, the refractive index of the blue phase liquid crystals may be changed, depending on whether an electrical field is applied to the blue phase liquid crystals. For example, when no electrical field is applied, the refractive index of the blue phase liquid crystals may be the same as the refractive index of the first and/or second lower sub-light adjusting structure 13. When an electrical field is applied, the refractive index of the blue phase liquid crystals may be the same as the refractive index of the first and/or second upper light adjusting structure 23. As such, when the first and second lower sub-light adjusting structure 13 is used to adjust the light, a voltage is applied on the first transparent electrode 12 and the second transparent electrode 22 respectively. That is, an electric field, which is not zero, is present between the first transparent electrode 12 and the second transparent electrode 22. This enables the refractive index of the blue phase liquid crystals to be the same as the refractive index of the first and/or second upper light adjusting structure 23. When the first and/or second lower sub-light adjusting structure 23 is used to adjust the light, no voltage is applied on the first transparent electrode 12 and the second transparent electrode 22 respectively. That is, the electric field between the first transparent electrode 12 and the second transparent electrode 22 is zero. This enables the refractive index of the blue phase liquid crystals to be the same as the refractive index of the first and/or second lower light adjusting structure 13.

For a common liquid crystal, the refractive index of the liquid crystal layer may be controlled by controlling the deflection state of the long axis of the liquid crystals. When the liquid crystal layer is not supplied with a voltage, the refractive index of the liquid crystal layer can be controlled by an aligning layer. When the aligning layer is not arranged, an electric field between the first transparent electrode 12 and the second transparent electrode 22 may be applied to control different deflection states of the liquid crystals, thereby obtaining different refractive indexes.

Figure 12:
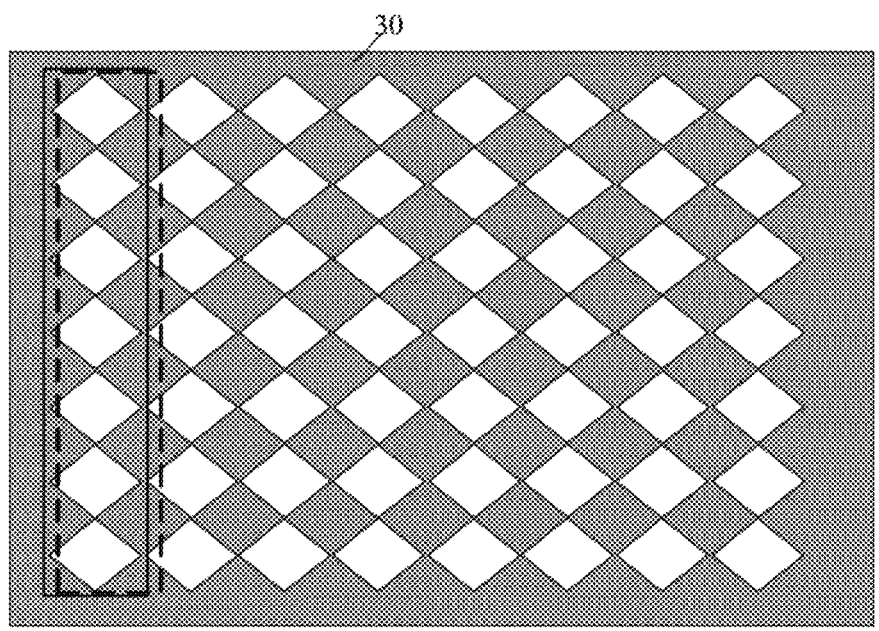
FIG. 12 is a schematic diagram of a black matrix on a light adjustment apparatus according to one embodiment of the present disclosure.

FIG. 12 is a schematic diagram of a black matrix on a light adjustment apparatus according to one embodiment of the present disclosure. The first substrate 10 or the second substrate 20 may further comprises a black matrix as shown in FIG. 12. The light adjusting apparatus is divided into a plurality of sub-pixel regions. The shape of openings of the black matrix which correspond to the sub-pixel areas 30 respectively is rhombus.

The light adjustment apparatus is divided into a plurality of sub-pixel regions, which are the sub-pixel regions when the light adjustment apparatus is applied in the 3D display apparatus.

In one embodiment, taking the 3D display in the first direction as an example, in an ideal case, a viewer can see sub-pixels in the solid line frame in FIG. 12 with a single-eye. However, there are deviations in the machining process, such as collimation angle of the backlight source, deviation of the position of the first light adjusting structure 13 and that of the second light adjusting structure 23, alignment deviation of the first substrate 10 and the second substrate 20 and other factors. The deviation will cause deviation of the observation area of the human eyes, and a viewer can also see part of the adjacent sub-pixels with a single-eye. That is, the viewed area may be the area indicated by the dotted line in FIG. 9. However, these adjacent sub-pixels are sub-pixels used for displaying another view image. Therefore, crosstalk is generated.

In addition, similar to the result of process deviation, when at different positions, a viewer can see different sub-pixels with a single-eye. When at the optimal watching position, a viewer can see sub-pixels in the solid line fame in FIG. 9 with a single-eye. When not at the optimal watching position, a viewer may see part of the adjacent sub-pixels, that is, the viewed area is the area indicated by the dotted line in FIG. 9, and these adjacent sub-pixels are sub-pixels used for displaying another view image. Therefore, crosstalk is generated.

Similarly, when 3D display is realized in the second direction, crosstalk can also be generated as described above.

However, under the same process deviation and the same position deviation, the value of crosstalk is lowered with the rhombic openings according to one embodiment of the present disclosure than that with the traditional strip-shaped pixel openings.

Another example of the present disclosure is a 3D display apparatus. The 3D display apparatus comprises the light adjustment apparatus as described above according to one embodiment of the present disclosure.

In another embodiment, the 3D display apparatus further comprises a display panel. The display panel comprises a plurality of sub-pixels arranged in an army mode. Light emitted by the display panel is collimated light.

Figure 13:
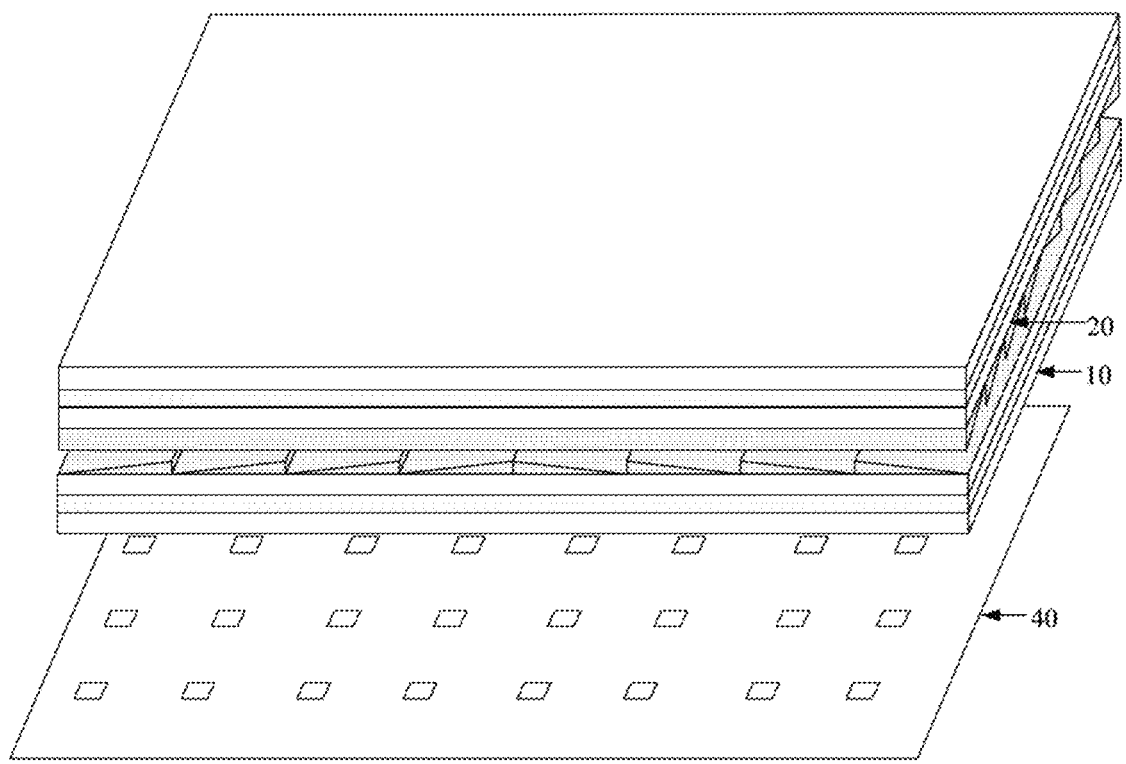
FIG. 13 is a schematic diagram of a 3D display apparatus according to one embodiment of the present disclosure.

FIG. 13 is a schematic diagram of a 3D display apparatus according to one embodiment of the present disclosure. As shown in FIG. 13, the 3D display apparatus further comprises a collimating dot matrix backlight module 40. The collimating dot matrix backlight module 40 comprises a plurality of point light sources arranged in an array mode. The collimating dot matrix backlight module 40 emits collimated light. Each sub-pixel area of the 3D display apparatus is provided with a point light source. The light adjusting apparatus corresponding to each sub-pixel area further comprises a color film.

Based on this structure, the gray scale of each sub-pixel is controlled by a collimating dot matrix backlight module. The color film may comprise a first color filter layer, a second color filter layer and a third color filter layer. Each sub-pixel area is provided with a color filter layer. The first color, the second color and the third color are three primary colors.

The display of left-eye images and right-eye images can be facilitated by the color film arranged on the light adjustment apparatus together with the collimating dot matrix backlight module 40. As such, the structure is quite simple, and the cost is low. For a wide-view-angle backlight, only a small amount of light plays a role in 3D viewing, thereby wasting a large amount of backlight power consumption. Compared with the wide-view-angle backlight, when adopting the collimating dot matrix backlight module 40 according to one embodiment of the present disclosure, light utilization efficiency is high and the required backlight brightness is low at the same brightness to the human eyes.

In one embodiment, the divergence angle of the collimated light emitted by the collimating dot matrix backlight module 40 is within 3 degrees so that the light utilization rate is further improved. That is, the angle of the collimating light relative to the light incident surface of the first base 11 ranges from 88.5 degrees to 91.5 degrees.

According to one embodiment of the present disclosure, the light adjustment apparatus may have the following features:

First, the light adjustment apparatus may achieve 3D function only in one direction at one time.

When the first light adjusting structure 13 plays a role in adjusting light to deliver left eye images to the left eye and right eye images to the right eye in the first direction, the second light adjusting structure 23 does not adjust light. Similarly, when the second light adjusting structure 23 is used for adjusting light to deliver left eye images to the left eye and right eye images to the right eye in the second direction, the first light adjusting structure 13 does not adjust light.

Second, in one embodiment, when the first light adjusting structure 13 plays a role in adjusting light, a left eye image is displayed by a plurality of rows of sub-pixels arranged in the first direction, and a right eye image is displayed by another plurality of rows of sub-pixels arranged in the first direction. All sub-pixels included in each row of the sub-pixels are arranged in the second direction.

Specifically, in one embodiment, in the first direction, the sub-pixels of the odd-numbered rows are used for displaying left-eye images. The sub-pixels of even-numbered rows are used for displaying right-eye images. In another embodiment, in the first direction, the sub-pixels of the odd-numbered rows are used for displaying right-eye images. The sub-pixels of the even-numbered rows are used for displaying left-eye images. As such, as the light adjustment apparatus is applied in a 3D display apparatus, when viewers are in a plurality of positions in the first direction, the first light adjusting structure 13 can deliver the left eye images to the left eyes of the viewers, and the right eye images to the right eyes of the viewers. Therefore, 3D display can be achieved in the first direction.

When the light adjustment apparatus is applied in a 3D display apparatus, a left-eye image and a right-eye image may be independently displayed by another structure, or a left-eye image and a right-eye image may be displayed with another structure in cooperation with the light adjustment apparatus.

When describing left-eye images and right-eye images, they are described in sub-pixel level as above. However, the display of left-eye images and right-eye images may be performed at pixel level. Specifically, when the first light adjusting structure 13 adjusts light, a left-eye image is displayed by a plurality of rows of pixels arranged in the first direction, and a right-eye image is displayed by a plurality of rows of pixels arranged in the first direction. Each row of pixels comprises at least three rows of sub-pixels arranged in the first direction. Sub-pixels of each row are arranged in a second direction.

Pixel level means a pixel is used as a minimum unit. Specific principle is similar to that of the sub-pixel level. Description thereof is not repeated herein.

Third, in one embodiment, when the second light adjusting structure 23 adjusts light, a left-eye image is displayed by a plurality of rows of sub-pixels arranged in the second direction, and a right-eye image is displayed by a plurality of rows of sub-pixels arranged in the second direction. All sub-pixels included in each row of sub-pixels am arranged in the first direction.

Specifically, in one embodiment, in the second direction, odd-numbered rows of sub-pixels are used for displaying left-eye images, and even-numbered rows of sub-pixels are used for displaying right-eye images. In another embodiment, in the second direction, odd-numbered rows of sub-pixels are used for displaying right-eye images, and even-numbered rows of sub-pixels are used for displaying left-eye images. As such, as the light adjustment apparatus is applied in a 3D display apparatus, and when viewers are in a plurality of positions in the second direction, the second light adjusting structure 23 can be used for delivering left-eye images to left eyes of the viewers, and right eye images to right eyes of the viewers. Therefore, 3D display can be achieved in the second direction.

In one embodiment, all sub-pixels are arranged in a matrix mode, therefore no matter whether in the first direction or in the second direction, all sub-pixels are arranged in a plurality of rows. The difference is that, when watched in the first direction, the sub-pixels are arranged in a plurality of rows, the sub-pixels of each row are arranged in the second direction. In contrast, when watched in the second direction, the sub-pixels are arranged in a plurality of rows, and the sub-pixels of each row are arranged in the first direction. When the first light adjusting structure 13 adjusts light, all sub-pixels are divided into a plurality of rows of sub-pixels in the first direction, and sub-pixels in each row are arranged in the second direction to display a left-eye image and a right-eye image. When the second light adjusting structure 23 adjusts light, all sub-pixels are divided into a plurality of rows of sub-pixels in the second direction, and sub-pixels in each row are arranged in the first direction to display a left-eye image and a right-eye image.

In one embodiment, a left-eye image and a right-eye image is described at sub-pixel level as above. However, the display of the left-eye image and the right-eye image can also be described at pixel level. Specifically, in one embodiment, when the second light adjusting structure 23 adjusts light, and a left-eye image is displayed by a plurality of rows of pixels arranged in the second direction, and a right-eye image is displayed by a plurality of rows of pixels arranged in the second direction. Each row of pixels comprises at least three rows of sub-pixels arranged in the second direction. Sub-pixels of each row are arranged in the first direction.

Pixel level means a pixel is used as a minimum unit. Specific principle is similar to that of the sub-pixel level. Description thereof is not repeated herein.

Fourth, the first direction and the second direction are relative.

Specifically, when the light adjustment apparatus is applied in a 3D display apparatus, relative to a display screen of the 3D display apparatus, users generally watch the display apparatus in a horizontal direction. However, the display apparatus may be rotated by 90 degree. For example, in one embodiment, the display apparatus is a mobile phone. When a user watches text information, a mobile phone is usually used vertically. However, when a user watches a video, the mobile phone is usually used horizontally.

As such, when the display apparatus is vertically placed, the first light adjusting structure 13 in the light adjusting apparatus is used for delivering left eye images to the left eye and right eye images to the right eye. The first direction is the horizontal direction. The second direction is the vertical direction. When the display apparatus is rotated by 90 degrees from the vertical direction to the horizontal direction, a second light adjusting structure 23 in the light adjusting apparatus is used for delivering left-eye images to the left eye, and right eye images to the right eye. In this case, the second direction is the horizontal direction, and the first direction is the vertical direction.

Fifth, for the liquid crystal layer, a refractive index of the liquid crystal layer can be controlled through an electric field between the first transparent electrode 12 and the second transparent electrode 22 according to one embodiment of the present disclosure.

As such, when the first light adjusting structure 13 is used for adjusting light, the second light adjusting structure 33 will not adjust light. In this scenario, the refractive index of the liquid crystal layer should be the same as that of the second light adjusting structure 23.

Similarly, when the second light adjusting structure 33 is used for adjusting light, the first light adjusting structure 13 will not adjust light. In this scenario, the refractive index of the liquid crystal layer should be the same as that of the first light adjusting structure 13.

Sixth, the first base 11, the first light adjusting structure 13, the second base 21 and the second light adjusting structure 33 are all transparent according to one embodiment of the present disclosure.

In the light adjustment apparatus according to one embodiment of the present disclosure, a first transparent electrode 12 and a first light adjusting structure 13 are arranged on the first substrate 10, a second transparent electrode 22 and a second light adjusting structure 33 are arranged on the second substrate 20, and a liquid crystal layer is arranged between the first substrate 10 and the second substrate 20. In this way, when the first light adjusting structure 13 adjusts light, the electric field between the first transparent electrode 12 and the second transparent electrode 22 is controlled so that the refractive index of the liquid crystal layer is the same as that of the second light adjusting structure 33. As a result, 3D display can be realized in the first direction. When the second light adjusting structure 33 adjusts light, the electric field between the first transparent electrode 12 and the second transparent electrode 22 is controlled so that the refractive index of the liquid crystal layer is the same as that of the first light adjusting structure 13, and 3D display can be realized in the second direction. When the light adjustment apparatus is applied in a 3D display apparatus, the 3D display function can be realized under both situations of the 3D display apparatus so that more scenarios can be displayed.

Another example of the present disclosure is a control method of the 3D display apparatus. The method includes controlling an electric field between the first transparent electrode 12 and the second transparent electrode 22 so that the refractive index of the second light adjusting structure 33 is the same as that of the liquid crystal layer, and using the first light adjusting structure 13 to deliver a left-eye image to the left eye and a right eye image to the right eye in a first direction. In another embodiment, an electric field between the first transparent electrode 12 and the second transparent electrode 22 is controlled so that the refractive index of the first light adjusting structure 13 is the same as the refractive index of the liquid crystal layer. A second light adjusting structure 23 is used to deliver the left-eye image to the left eye and a right-eye image to the right eye in the second direction.

In one embodiment, the refractive index of the liquid crystal layer is equal to the first light adjusting structure 13 when a voltage is not applied. Thus, when the refractive index of the liquid crystal layer needs to be equal to that of the first light adjusting structure 13, a voltage is not applied to the first transparent electrode 12 and the second transparent electrode 22. That is, the electric field between the first transparent electrode 12 and the second transparent electrode 22 is controlled to be zero. In another embodiment, the refractive index of the liquid crystal layer is equal to that of the second light adjusting structure 33 when a voltage is not applied. Thus, when the refractive index of the liquid crystal layer is needed to be equal to that of the second light adjusting structure 33, a voltage is not applied to the first transparent electrode 12 and the second transparent electrode 22. That is, the electric field between the first transparent electrode 12 and the second transparent electrode 22 is controlled to be zero.

As described above, 3D function of the 3D display apparatus can be realized under two usage modes so that more scenes can be displayed.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A display panel, comprising:
   a first pixel unit; and
   a second pixel unit,
   wherein the first pixel unit comprises a first light adjusting structure configured to adjust an angle of light that transmits through the first light adjusting structure,
   the second pixel unit comprises a second light adjusting structure configured to adjust an angle of light that transmits through the second light adjusting structure,
   the first pixel unit and the second pixel unit are alternatively disposed in the display panel,
   wherein the first light adjusting structure comprises a first transparent electrode, a second transparent electrode, a first liquid crystal layer, and a first sub-light adjusting structure, the first liquid crystal layer and the first sub-light adjusting structure being between the first transparent electrode and the second transparent electrode; and
   the second light adjusting structure comprises the first transparent electrode, the second transparent electrode, and a second liquid crystal layer between the first transparent electrode and the second transparent electrode;
   wherein the second light adjusting structure further comprises a second sub-light adjusting structure, the second sub-light adjusting structure is between the first transparent electrode and the second transparent electrode;
   wherein the first sub-light adjusting structure comprises a first upper sub-light adjusting structure and a first lower sub-light adjusting structure being respectively on both sides of the first liquid crystal layer, and the second sub-light adjusting structure comprises a second upper sub-light adjusting structure and a second lower sub-light adjusting structure being respectively on both sides of the second liquid crystal layer;
   wherein a plurality of first pixel units and a plurality of second pixel units are arranged in an array of rows and columns, the first lower sub-light adjusting structures of the first pixels in each of the columns have first inclined surfaces facing a first direction, the first inclined surfaces facing the first direction are arranged in a same column, the second lower sub-light adjusting structures of the second pixels in each of the columns have second inclined surfaces facing a second direction, the second inclined surfaces facing the second direction are arranged in the same column, and the first direction and the second direction are opposite to each other along a row direction; and
   the first upper sub-light adjusting structures of the first pixels in each of the rows have third inclined surfaces facing a third direction, the third inclined surfaces facing the third direction are arranged in a same row, the second upper sub-light adjusting structures of the second pixels in each of the rows have fourth inclined surfaces facing a fourth direction, the fourth inclined surfaces facing the fourth direction are arranged in the same row, and the third direction and the fourth direction are opposite to each other along a column direction.

2. The display panel of claim 1, further comprising a first base and a second base opposite the first base, the plurality of first pixel units and the plurality of second pixel units being between the first base and the second base,
   wherein the first base comprising a first surface, the first transparent electrode and the first lower sub-light adjusting structure of the first pixel unit are stacked on the first surface, the first transparent electrode and the second lower sub-light adjusting structure of the second pixel unit are stacked on the first surface, and
   the second base comprising a second surface, the second transparent electrode and the first upper sub-light adjusting structure of the first pixel unit are stacked on the second surface, the second transparent electrode and the second upper sub-light adjusting structure of the second pixel unit are stacked on the second surface.

3. The display panel of claim 2, wherein the first upper sub-light adjusting structure and the first lower sub-light adjusting structure have different refractive indexes, and the second upper sub-light adjusting structure and the second lower sub-light adjusting structure have different refractive indexes; the first upper sub-light adjusting structure and the first lower sub-light adjusting structure are perpendicular to each other, and the second upper sub-light adjusting structure and the second lower sub-light adjusting structure are perpendicular to each other.

4. The display panel of claim 2, wherein the first lower sub-light adjusting structure comprises a first bottom surface and a first inclined surface opposite the first bottom surface, the first bottom surface is arranged on the first base, the first inclined surface and the first bottom surface form a first acute angle, and the first acute angle is configured to determine exiting direction of a light that enters the first lower sub-light adjusting structure, the first upper sub-light adjusting structure comprises a second bottom surface and a second inclined surface opposite the second bottom surface, the second bottom surface is arranged on the second base, the second inclined surface and the second bottom surface form a second acute angle, and the second acute angle is configured to determine exiting direction of a light that enters the first upper sub-light adjusting structure.

5. The display panel of claim 2, wherein the second lower sub-light adjusting structure comprises a third bottom surface and a third inclined surface opposite the third bottom surface, the third bottom surface is arranged on the first base, the third inclined surface and the third bottom surface form a third acute angle, and the third acute angle is configured to determine exiting direction of a light that enters the second lower sub-light adjusting structure, the second upper sub-light adjusting structure comprises a fourth bottom surface and a fourth inclined surface opposite the fourth bottom surface, the fourth bottom surface is arranged on the second base, the fourth inclined surface and the fourth bottom surface form a fourth acute angle, and the fourth acute angle is configured to determine exiting direction of a light that enters the second upper sub-light adjusting structure.

6. The display panel of claim 1, wherein the first liquid crystal layer and the second liquid crystal layer comprises blue phase liquid crystals, and a refractive index of the blue phase liquid crystals in the first liquid crystal layer and the second liquid crystal layer is configured to be adjusted by an electrical field between the first transparent electrode and the second transparent electrode.

7. The display panel of claim 1, wherein a cross-section of the first upper sub-light adjusting structure along a plane perpendicular to the first base has a shape of a right-angled triangle, a cross-section of the first lower sub-light adjusting structure along a plane perpendicular to the second base has a shape of a right-angled triangle.

8. The display panel of claim 1, wherein a cross-section of the second upper sub-light adjusting structure along a plane perpendicular to the first base has a shape of a right-angled triangle, a cross-section of the second lower sub-light adjusting structure along a plane perpendicular to the second base has a shape of a right-angled triangle.

9. The display panel of claim 1, wherein the plurality of first pixel units and the plurality of second pixel units are separated by a black matrix, the black matrix comprises a plurality of openings substantially coinciding with the plurality of first pixel units and the plurality of second pixel units respectively, and each of the plurality of openings has a rhombus shape.

10. The display panel of claim 1, wherein the first sub-light adjusting structure and the second sub-light adjusting structure each are made of a transparent resin.

11. The display panel of claim 1, wherein the first transparent electrode is a planar electrode covering the first upper sub-light adjusting structure and the second upper sub-light adjusting structure, and the second transparent electrode is a planar electrode covering the first lower sub-light adjustment structure and the second lower sub-light adjusting structure.

12. The display panel of claim 1, wherein a planarization layer is formed on the first upper sub-light adjusting structure and the second upper sub-light adjusting structure, and another planarization layer is formed on the first lower sub-light adjusting structure and the second lower sub-light adjusting structure.

13. The display panel of claim 1, further comprising a collimated dot matrix backlight module, wherein the collimated dot matrix backlight module comprises a plurality of point light sources arranged in an array, each of the point light sources corresponding to one of the plurality of first pixel units and the plurality of second pixel units, and the collimated dot matrix backlight module emits collimated light.

14. The display panel of claim 13, wherein the collimated dot matrix backlight module emits the collimated light with a divergence angle of less than about 3°.

15. The display panel of claim 1, wherein each of the plurality of first pixel units and the plurality of second pixel units comprises a color film.

16. A display apparatus, comprising the display panel of claim 1.

* * * * *